(12) United States Patent
Takemori (10) Patent No.: US 10,967,860 B2
(45) Date of Patent: Apr. 6, 2021

(54) VEHICLE CONTROL DEVICE

(71) Applicant: Honda Motor Co., Ltd., Tokyo (JP)

(72) Inventor: Yuichiro Takemori, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/574,003

(22) Filed: Sep. 17, 2019

(65) Prior Publication Data

US 2020/0086870 A1    Mar. 19, 2020

(30) Foreign Application Priority Data

Sep. 18, 2018    (JP) .............................. JP2018-174079

(51) Int. Cl.
*B60W 30/16*    (2020.01)
*B60W 10/107*    (2012.01)
(Continued)

(52) U.S. Cl.
CPC .......... *B60W 30/16* (2013.01); *B60W 10/107* (2013.01); *B60W 2050/0073* (2013.01);
(Continued)

(58) Field of Classification Search
None
See application file for complete search history.

(56) References Cited

U.S. PATENT DOCUMENTS

| | | | | |
|---|---|---|---|---|
| 9,482,773 | B2 * | 11/2016 | Howieson | G01V 1/3808 |
| 10,214,211 | B2 * | 2/2019 | Kobayashi | B60W 30/16 |

(Continued)

FOREIGN PATENT DOCUMENTS

| | | |
|---|---|---|
| CN | 101238020 | 8/2008 |
| CN | 102198797 | 9/2011 |

(Continued)

OTHER PUBLICATIONS

Office Action of Japan Counterpart Application, with English translation thereof, dated Mar. 31, 2020, pp. 1-6.

(Continued)

*Primary Examiner* — Timothy Hannon
(74) *Attorney, Agent, or Firm* — JCIPRNET (57) ABSTRACT

A vehicle control device is provided which is capable of properly satisfying an acceleration request from a driver even when the driver performs a step-on operation of an accelerator pedal in the implementation of an ACC mode. The vehicle control device is capable of: a front car follow-up travel mode, in which a driving force and a transmission ratio are controlled based on a first accelerator position (AP1) for an inter-vehicle distance to a preceding vehicle to be a target inter-vehicle distance; and an override mode, in which the driving force and the transmission ratio are controlled based on a second accelerator position (AP2) determined by an operation of an accelerator operator performed by a driver. Compared with a second transmission characteristic selected in the override mode, in a first transmission characteristic selected in the front car follow-up travel mode, a threshold of the accelerator position at which at least downshift of a transmission (TM) occurs is set to a higher value or an amount of change of the transmission ratio along with the downshift of the transmission (TM) is set to a lower value.

16 Claims, 7 Drawing Sheets

(51) Int. Cl.
*F16H 61/02* (2006.01)
*F16H 59/20* (2006.01)
*F16H 61/66* (2006.01)
*B60W 50/00* (2006.01)

(52) U.S. Cl.
CPC ....... *B60W 2540/103* (2013.01); *F16H 59/20* (2013.01); *F16H 2061/0227* (2013.01); *F16H 2061/6615* (2013.01)

(56) References Cited

U.S. PATENT DOCUMENTS

| | | | | |
|---|---|---|---|---|
| 2010/0082208 | A1* | 4/2010 | Asai | F16H 61/0213 |
| | | | | 701/58 |
| 2013/0060434 | A1* | 3/2013 | Kiuchi | F16H 61/0213 |
| | | | | 701/56 |
| 2015/0239471 | A1* | 8/2015 | Azuma | B60W 30/188 |
| | | | | 701/54 |
| 2019/0202460 | A1* | 7/2019 | Ishikawa | B60W 30/18 |
| 2019/0204828 | A1* | 7/2019 | Ishikawa | G05D 1/0223 |

FOREIGN PATENT DOCUMENTS

| | | |
|---|---|---|
| CN | 102906467 | 1/2013 |
| CN | 103016708 | 4/2013 |
| CN | 103209876 | 7/2013 |
| CN | 106256626 | 12/2016 |
| JP | 2003112537 | 4/2003 |
| JP | 2016133202 | 7/2016 |
| JP | 2017052319 | 3/2017 |

OTHER PUBLICATIONS

Office Action of China Counterpart Application, with English translation thereof, dated Sep. 27, 2020, pp. 1-16.

* cited by examiner

વાહન CONTROL DEVICE

VEHICLE CONTROL DEVICE

CROSS-REFERENCE TO RELATED APPLICATION

This application claims the priority benefit of Japan Patent Application No. 2018-174079, filed on Sep. 18, 2018. The entirety of the above-mentioned patent application is hereby incorporated by reference herein and made a part of this specification.

BACKGROUND OF THE DISCLOSURE

Technical Field

The disclosure relates to a vehicle control device, in particular, to a vehicle control device capable of controlling a driving force of a driving source and a transmission ratio of a transmission so that an inter-vehicle distance to a preceding vehicle becomes a target inter-vehicle distance.

Related Art

Conventionally, there is a vehicle control device which controls a driving force of a driving source and a transmission ratio of a transmission. Such a vehicle control device may have a function for following up a preceding vehicle, which is referred to as an ACC (adaptive cruise control) function. In the vehicle control device with the ACC function, a rotation number of an engine and the transmission ratio of the transmission can be controlled automatically so that an inter-vehicle distance to the preceding vehicle becomes a target inter-vehicle distance.

In the vehicle with the ACC function as described above, there is a possibility that a phenomenon (hunting phenomenon) may occur that the rotation number of the engine may fluctuate slightly around a threshold while the ACC mode is being performed. Therefore, a measure for preventing this hunting phenomenon is required.

Accordingly, as a measure to prevent the hunting phenomenon, in the ACC mode, it may be considered to perform control to switch to a shift map (shift characteristic) in which a shift down (kick down) of the transmission is less likely to occur. However, if the control is performed to switch to the shift characteristic that is unlikely to cause the downshift (kickdown), the acceleration responsiveness of the vehicle during ACC may be degraded. Therefore, the driver of the vehicle may perform a step-on operation of an accelerator pedal in order to intentionally accelerate the vehicle. In such a case, there is a risk that the downshift (kickdown) of the transmission is still difficult to occur if the switched transmission characteristic is maintained, and thus an acceleration request from the driver who performs the step-on operation of the accelerator pedal cannot be satisfied.

Related art can be found in the Japanese Patent Application Laid-Open No. 2017-52319.

SUMMARY

A vehicle control device of one of some exemplary embodiments of a disclosure includes a driving source (EG) of a vehicle; a transmission (TM), which shifts rotation of a driving force from the driving source (EG) and transmits the rotation to a driving wheel side; and a travel control device, which controls the driving force of the driving source (EG) and a transmission ratio of the transmission (TM); wherein the travel control device is capable of operating under: a front car follow-up travel mode, in which the driving force and the transmission ratio are controlled based on a first accelerator position which is an accelerator position for an inter-vehicle distance to a preceding vehicle to be a target inter-vehicle distance or for a vehicle speed to be a target set vehicle speed; and an override mode, in which the driving force and the transmission ratio are controlled based on a second accelerator position which is an accelerator position determined by an operation of an accelerator operator performed by a driver; a transmission characteristic showing a relationship between the vehicle speed of the vehicle and the transmission ratio of the transmission includes a first transmission characteristic selected in the front car follow-up travel mode, and a second transmission characteristic selected in the override mode; compared with the second transmission characteristic, in the first transmission characteristic, a threshold of the accelerator position at which at least downshift of the transmission (TM) occurs is set to a higher value or an amount of change of the transmission ratio along with the downshift of the transmission (TM) is set to a lower value.

According to the vehicle control device of one of some exemplary embodiments of a disclosure, an acceleration request from a driver can be satisfied properly even when the driver performs a step-on operation of an accelerator pedal in the implementation of an ACC mode.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EMBODIMENTS

Some of the exemplary embodiments of the disclosure are accomplished based on the problems aforesaid, and provides a vehicle control device capable of properly satisfying an acceleration request from a driver even when the driver performs a step-on operation of an accelerator pedal in the implementation of the ACC mode.

The vehicle control device of the exemplary embodiment of the disclosure includes: a driving source (EG) of a vehicle; a transmission (TM), which shifts rotation of a driving force from the driving source (EG) and transmits the rotation to a driving wheel side; and a travel control device, which controls the driving force of the driving source (EG) and a transmission ratio of the transmission (TM). The travel control device is capable of operating in a front car follow-up travel mode and an override mode. Under the front car follow-up travel mode, the driving force and the transmission ratio are controlled based on a first accelerator position (AP1) which is an accelerator position for an inter-vehicle distance to a preceding vehicle to be a target inter-vehicle distance or for a vehicle speed to be a target set vehicle speed. Under the override mode, the driving force and the transmission ratio are controlled based on a second accelerator position (AP2) which is an accelerator position determined by an operation of an accelerator operator performed by a driver. A transmission characteristic, showing a relationship between the vehicle speed of the vehicle and the transmission ratio of the transmission, includes a first transmission characteristic selected in the front car follow-up travel mode, and a second transmission characteristic selected in the override mode. Compared with the second transmission characteristic, in the first transmission characteristic, a threshold of the accelerator position at which at least downshift of the transmission (TM) occurs is set to a higher value or an amount of change of the transmission ratio along with the downshift of the transmission (TM) is set to a lower value.

According to the vehicle control device of the exemplary embodiment of the disclosure, compared with the second transmission characteristic selected in the override mode, in the first transmission characteristic selected in the front car follow-up travel mode, the threshold of the accelerator position at which at least the downshift of the transmission occurs is set to a higher value or the amount of change of the transmission ratio along with the downshift of the transmission is set to a lower value, and thereby the downshift (kickdown) of the transmission can be more difficult to occur or the amount of change of the transmission ratio along with the downshift can be suppressed to a smaller amount in the front car follow-up travel mode than in the override mode. In this way, the kickdown can be prevented from occurring frequently in the front car follow-up travel mode, and thus occurrence of slight fluctuations (hunting) of a rotation number of the driving source can be effectively suppressed.

On the other hand, in the override mode in which the driving force and the transmission ratio are controlled based on the second accelerator position which is an accelerator position determined by the operation of the accelerator operator performed by the driver, the downshift (kickdown) of the transmission is made easy to occur and the amount of change of the transmission ratio along with the downshift of the transmission is increased, and thereby acceleration of the vehicle that more properly reflects an intention of the driver can be achieved.

In addition, in this control device, the travel control device may select, when the driver operates the accelerator operator in the front car follow-up travel mode, the second transmission characteristic instead of the first transmission characteristic in the front car follow-up travel mode, on the condition that the second accelerator position (AP2) is larger than the first accelerator position (AP1).

When the driver operates the accelerator operator in the front car follow-up travel mode, it is clear that the driver has an intention to accelerate the vehicle when the accelerator position determined by the operation of the driver is larger than the accelerator position for the inter-vehicle distance to the preceding vehicle to be the target inter-vehicle distance. Accordingly, in this case, if the downshift (kickdown) of the transmission is made easy to occur or the amount of change of the transmission ratio along with the downshift of the transmission is increased by selecting the second transmission characteristic instead of the first transmission characteristic, acceleration of the vehicle that more properly reflects an intention of the driver can be achieved.

In addition, when the driver operates the accelerator operator in the front car follow-up travel mode, the second transmission characteristic may be selected instead of the first transmission characteristic in the front car follow-up travel mode, on the condition that the first accelerator position (AP1) is the maximum value (WOT) or a value close to the maximum value (WOT) and the second accelerator position (AP2) is larger than a first threshold (APH2) which is a value smaller than the first accelerator position (AP1).

According to this configuration, the downshift (kickdown) of the transmission can be more reliably made to occur even when the first accelerator position is the maximum value or the value close to the maximum value. Accordingly, acceleration of the vehicle that more properly reflects an intention of the driver can be achieved.

In addition, the transmission (TM) may be a continuously variable transmission capable of steplessly changing the transmission ratio; the travel control device may be capable of performing a step shift control of changing a rotation number (Ne) of the driving source (EG) and the transmission ratio of the transmission (TM) in steps; and when the driver operates the accelerator operator in the front car follow-up travel mode, the travel control device may perform the step shift control when the second accelerator position (AP2) exceeds the second threshold (APH3), and not perform the step shift control when the second accelerator position (AP2) does not exceed the second threshold (APH3).

When the driver operates the accelerator operator in the front car follow-up travel mode, a feeling of strangeness may be felt by the driver of the vehicle if the step shift control is performed when the accelerator position determined by the operation is small; however, according to the above configuration, the step shift control is performed only when the second accelerator position exceeds the second threshold, and thereby the step shift control is not performed when the accelerator position determined by the operation of the driver is small, and thus the feeling of strangeness is not felt by the driver.

Alternatively, when the driver operates the accelerator operator in the front car follow-up travel mode and thereby the second accelerator position (AP2) exceeds the second threshold (APH3), the step shift control may be performed when the rotation number (Ne) of the driving source (EG) does not exceed a third threshold (Ne1), and the step shift control may not be performed when the rotation number (Ne) of the driving source (EG) exceeds the third threshold (Ne1).

According to this configuration, when the driver operates the accelerator operator in the front car follow-up travel mode, and the second accelerator position is the maximum value or the value close to the maximum value, the step shift control is performed when the rotation number of the driving source does not exceed the third threshold, and thereby the step shift control is performed only when there is room for increase in the rotation number of the driving source. In this way, by upshifting the transmission in a state that the accelerator position along with the operation of the driver is the maximum value or the value close to the maximum value and the rotation number of the driving source is large, the feeling of strangeness felt by the driver can be effectively prevented.

In addition, the transmission (TM) may be a continuously variable transmission capable of steplessly changing the transmission ratio; when there is a difference between an actual rotation number and a target rotation number of the continuously variable transmission, the travel control device may perform a control of bringing the actual rotation number close to the target rotation number by controlling oil pressure supplied to the continuously variable transmission; in this control, an inclination for bringing the actual rotation number close to the target rotation number may be varied between the implementation of the front car follow-up travel mode and the implementation of the override mode, for example, the inclination for bringing the actual rotation number close to the target rotation number is larger in the override mode than in the front car follow-up travel mode.

Alternatively, in the above control, the target rotation number itself may be varied between the implementation of the front car follow-up travel mode and the implementation of the override mode, for example, the target rotation number is larger in the implementation of the override mode than in the implementation of the front car follow-up travel mode.

According to these configurations, the following effects can be obtained: the inclination for bringing the actual rotation number of the continuously variable transmission to the target rotation number or the target rotation number itself is varied between the implementation of the front car follow-up travel mode and the implementation of the override mode, and thereby a smooth transmission can be achieved in the implementation of the front car follow-up travel mode; during a normal travel (a travel by a user operation) other than the front car follow-up travel mode, the user who performs this operation or a vehicle occupant hardly notices the transmission and thus a more active transmission operation can be performed.

Besides, the reference numerals in the above parentheses indicate drawing reference numerals of corresponding components in the embodiments described later for reference.

According to the vehicle control device of the exemplary embodiment of the disclosure, an acceleration request from a driver can be satisfied properly even when the driver performs a step-on operation of an accelerator pedal in the implementation of an ACC mode.

In the following, embodiments of the disclosure are described with reference to the attached drawings.

Figure 1:
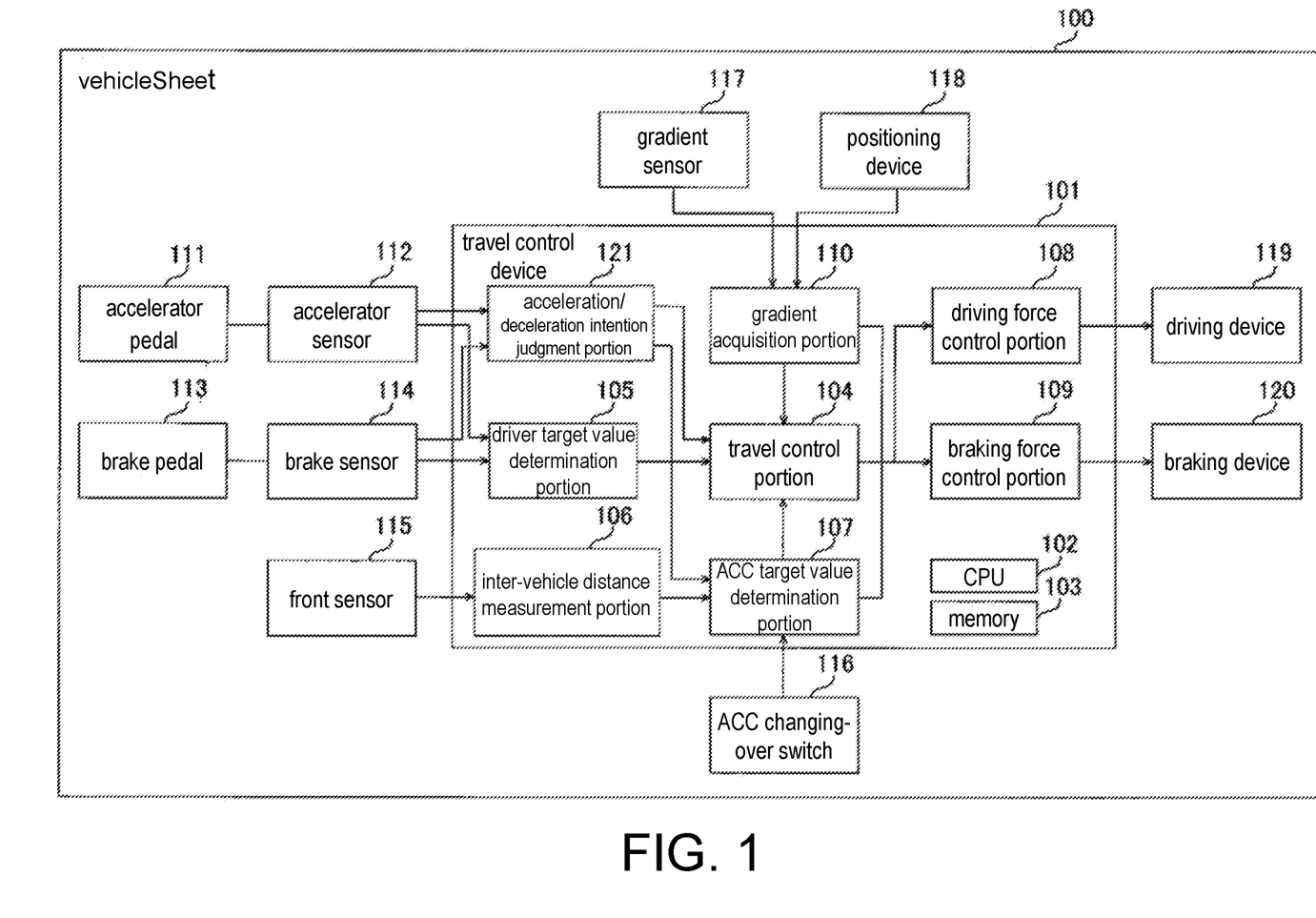
FIG. 1 is a block diagram showing a configuration of a vehicle control device of an embodiment of the disclosure.

FIG. 1 is a block diagram showing a function configuration of a vehicle equipped with a control device of an embodiment of the disclosure. A vehicle 100 shown in the diagram is, but not limited to, a four-wheeled car, and may be a two-wheeled car, a three-wheeled car or the like. In addition, the vehicle 100 may be any one of a gasoline car, a hybrid car, an electric car and the like.

The vehicle 100 has a travel control device 101 for controlling the travel of the vehicle 100. The travel control device 101 may be implemented by an electronic control unit (ECU) which is a computer. The travel control device 101 includes a processor 102 which is configured by a central processing unit (CPU) and the like, and a memory 103 which is configured by a combination of ROM or RAM and the like. Function blocks such as a travel control portion 104 and the like included in the travel control device 101 may be implemented by a program stored in the memory 103, and in this case, the function of each function block is performed by the execution of this program by the processor 102. Instead, the function blocks of the travel control device 101 may be implemented by private circuits such as an ASIC (application specific integrated circuit) and the like. Furthermore, the travel control device 101 may be implemented by one ECU, or be implemented by a plurality of ECUs which are communicable through network such as a CAN (controller area network) and the like. When the travel control device 101 is implemented by a plurality of ECUs, each ECU has the processor 102 and the memory 103, and one or more of the function blocks included in the travel control device 101.

The travel control device 101 controls a driving force of the vehicle 100 by controlling a driving device 119, and controls a braking force of the vehicle 100 by controlling a braking device 120.

A driver target value determination portion 105 receives a signal from an accelerator sensor 112 which detects a stoke amount of an accelerator pedal 111, and a signal from a brake sensor 114 which detects a stoke amount of a brake pedal 113. The driver target value determination portion 105 determines target values of the driving force and the braking force of the vehicle 100 based on operation amounts of the accelerator pedal 111 and the brake pedal 113. In the following, the target values based on the operation amounts of the accelerator pedal 111 and the brake pedal 113 are referred to as driver target values.

An inter-vehicle distance measurement portion 106 receives an inter-vehicle distance to a preceding vehicle which is measured by the inter-vehicle distance measurement portion 106 using data obtained by a front sensor 115. The front sensor 115 is a sensor for detecting the front of the vehicle 100 and may be, for example, a millimeter-wave radar, an optical camera sensor, a stereo camera, an infrared sensor radar and the like. When the front sensor 115 is a camera sensor, the inter-vehicle distance measurement portion 106 measures the inter-vehicle distance to the preceding vehicle by analyzing an image obtained by the camera sensor.

The vehicle 100 has an ACC (adaptive cruise control). The ACC refers to an automatic speed control function for following the preceding vehicle and travelling at a constant speed while maintaining the inter-vehicle distance. An ACC target value determination portion 107 starts working when the driver uses an ACC change-over switch 116 to enable the ACC, and ends working when the ACC is disabled. The ACC change-over switch 116 may be physically implemented by a button, a lever or the like, or be implemented by a virtual button displayed on a touch panel. The ACC target value determination portion 107 determines the target values of the driving force and the braking force of the vehicle 100 for following the preceding vehicle based on the inter-vehicle distance to the preceding vehicle measured by the inter-vehicle distance measurement portion 106. In the following, the target values determined by the ACC are referred to as ACC target values.

A gradient acquisition portion 110 acquires a gradient of a travel path on which the vehicle 100 travels. The gradient acquisition portion 110 may use data from a gradient sensor 117 which is a gyro sensor, an acceleration sensor or the like to acquire the gradient. Instead of this or along with this, the gradient acquisition portion 110 may acquire a geographical position of the vehicle 100 by a positioning device 118 such as a GPS or the like, and acquire the gradient from map data based on the geographical position. Furthermore, the gradient acquisition portion 110 may acquire the gradient of the travel path based on an output torque, a braking force of a brake, or the like.

An acceleration/deceleration intention judgment portion 121 judges whether the driver has an intention of acceleration or deceleration based on the operation amounts of the accelerator pedal 111 and the brake pedal 113 from the driver. Furthermore, when there is an intention of acceleration or deceleration, whether it is the intention of acceleration or the intention of deceleration is judged. Specifically, the acceleration/deceleration intention judgment portion 121 judges that there is no intention of acceleration and deceleration when the stoke amount of the accelerator pedal 111 and the stoke amount of the brake pedal 113 are both 0. The acceleration/deceleration intention judgment portion 121 judges that there is an intention of acceleration when the stoke amount of the accelerator pedal 111 is positive, and judges that there is an intention of deceleration when the stoke amount of the brake pedal 113 is positive.

A travel control portion 104 controls the travel of the vehicle 100 by controlling the driving force and the braking force of the vehicle 100 based on one of the driver target values and the ACC target values. The travel of the vehicle 100 includes start, acceleration, constant speed travel, deceleration, and stop.

The travel control portion 104 controls the driving force and the braking force of the vehicle 100 to control the travel. Specifically, the travel control portion 104 controls the driving device 119 through a driving force control portion 108 to achieve a desired driving force, and controls the braking device 120 through a braking force control portion 109 to achieve a desired braking force.

The braking device 120 includes brakes arranged on each wheel of the vehicle 100 and a peripheral device for controlling each brake. For example, a brake actuator which controls a brake fluid pressure corresponding to a deceleration command output from the travel control device 101 is included.

Figure 2:
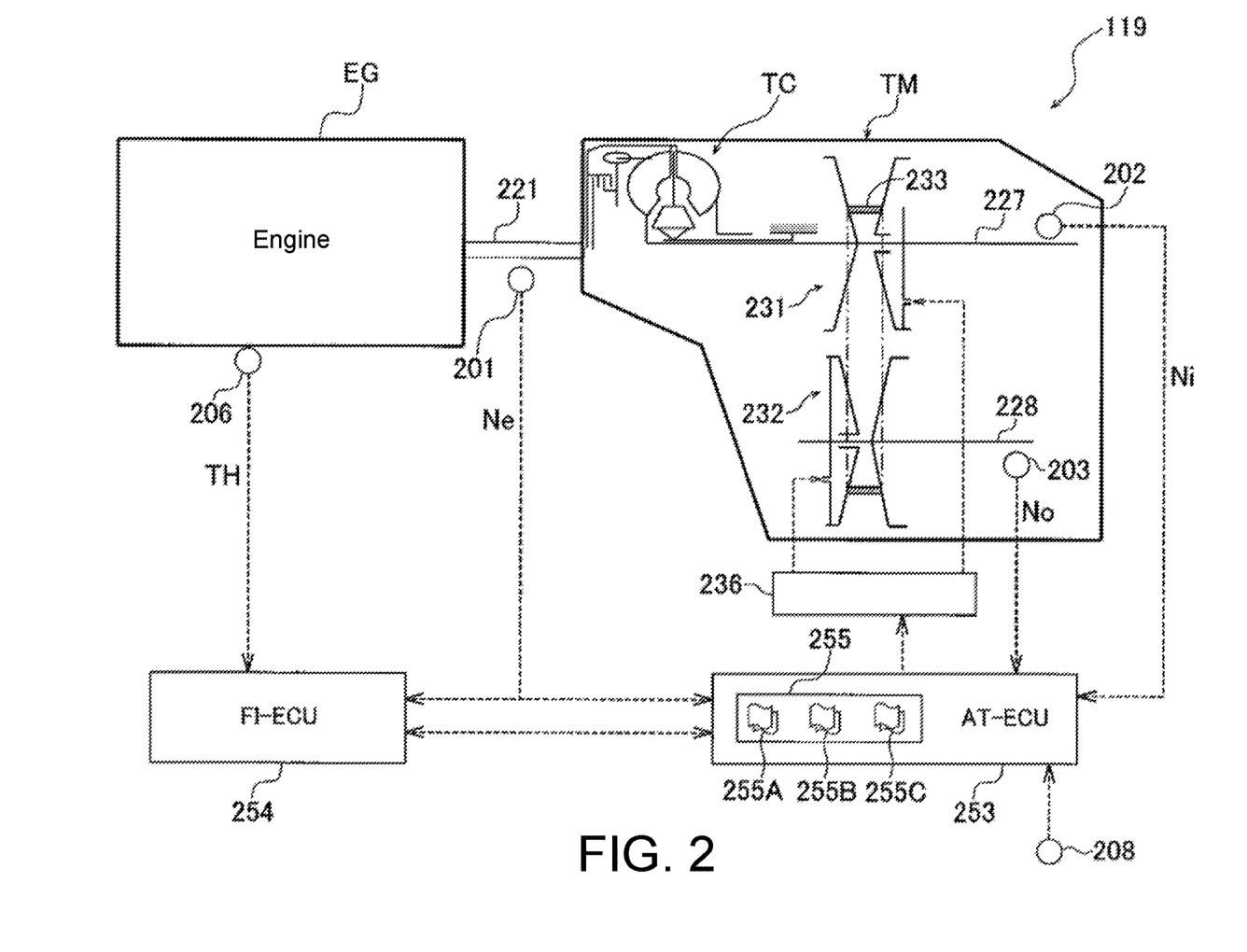
FIG. 2 is a diagram showing a configuration of a driving device of an embodiment of the disclosure.

FIG. 2 is a diagram showing a configuration of the driving device 119. As shown in the diagram, the driving device 119 of the vehicle 100 of the embodiment includes an internal combustion engine (engine) EG which is a driving source, and an automatic transmission TM connected to the engine EG. A rotation output of the engine EG is output to a crankshaft (an output shaft of the engine EG) 221 and is transmitted to an input shaft 227 of the automatic transmission TM via a torque converter TC. The automatic transmission TM includes a continuously variable transmission (CVT) which steplessly shifts and outputs the transmitted driving force. As shown in the diagram as an example, the continuously variable transmission can be a belt-type continuously variable transmission which includes a driving pulley 231 arranged on the input shaft 227, a driven pulley 232 arranged on an output shaft 228, and an endless belt 233 arranged being bridged over the driving pulley 231 and the driven pulley 232.

In addition, the driving device 119 includes a FI-ECU (fuel injection electronic control unit) 254 for electronically controlling the engine EG, an AT-ECU (automatic transmission electronic control unit) 253 for electronically controlling the automatic transmission TM, and an oil pressure control device 236 for controlling a lateral pressure of the pulley included in the automatic transmission TM or an engagement pressure of a clutch according to the control of the AT-ECU 253.

In addition, a crankshaft rotation number sensor 201 which detects a rotation number Ne of the crankshaft 221 (engine EG) is arranged. In addition, an input shaft rotation number sensor 202 which detects a rotation number Ni of the input shaft 227 (an input shaft rotation number of the automatic transmission TM) is arranged. In addition, an output shaft rotation number sensor 203 which detects a rotation number No of the output shaft 228 (an output shaft rotation number of the automatic transmission TM) is arranged. The rotation number data Ne, Ni, No detected by the respective sensors 201-203 and the vehicle speed data calculated from No are given to the AT-ECU 253. In addition, the engine rotation number data Ne is given to the FI-ECU (fuel injection electronic control unit) 254. In addition, a throttle position sensor 206 which detects a throttle position TH of the engine EG is arranged. Data of the throttle position TH is given to the FI-ECU 254.

In addition, the AT-ECU 253 for controlling the automatic transmission TM has a transmission characteristic (transmission response characteristic) 255 in which an area of the transmission ratio that can be set by the automatic transmission TM is defined corresponding to the vehicle speed detected by the vehicle speed sensor 208 and the accelerator position detected by the accelerator sensor 112 (see FIG. 1). The transmission characteristic 255 includes (the area of) the transmission ratio that can be set by the automatic transmission TM with respect to the vehicle speed and the accelerator position, and plural types of transmission characteristics having different characteristics are prepared in advance. The transmission characteristic may include an occurrence possibility of the kickdown in the automatic transmission TM. Here, a normal travel transmission characteristic 255C selected in a normal travel other than the ACC mode, an ACC transmission characteristic 255A selected in the implementation of the ACC mode, an override transmission characteristic 255B selected when the driver operates the accelerator pedal 111 in the ACC mode and the like are included. In a transmission control of the automatic transmission TM, the AT-ECU 253 performs a control of changing the transmission ratio of the automatic transmission TM according to the transmission characteristic selected from the plural types of transmission characteristics.

In addition, the travel control device 101 can switch and control a stepless transmission mode and a stepped transmission mode corresponding to an operation state of the vehicle 100 as a transmission mode of the automatic transmission TM. In this case, the transmission ratio is controlled steplessly in the stepless transmission mode, and the transmission ratio is controlled steppedly in the stepped transmission mode. That is, in the stepped transmission mode, the travel control device 101 can perform a step shift control which changes the rotation number of the engine EG and the transmission ratio of the stepless transmission TM in steps (steppedly). In this way, although it is a transmission in the continuously variable transmission, the occupant of the vehicle can feel like a transmission of a stepped transmission (multi-stepped transmission).

Besides, the travel control device 101 of the embodiment can switch and perform the ACC mode (front car follow-up travel mode) in which the driving force of the engine EG and the transmission ratio of the automatic transmission TM are automatically controlled based on the accelerator position (ACC target values) for the inter-vehicle distance to the preceding vehicle to be the target inter-vehicle distance, and the normal travel mode or the override mode in which the driving force of the engine EG and the transmission ratio of the automatic transmission TM are controlled based on the accelerator position (driver target values) determined by the operation of the accelerator pedal 111 performed by the driver. Besides, the transmission characteristic showing a relationship between the vehicle speed of the vehicle 100 and the transmission ratio of the automatic transmission TM includes the normal travel transmission characteristic 255C selected in the normal travel mode, the ACC transmission characteristic 255A (the first transmission characteristic) selected in the ACC mode, and the override transmission characteristic 255B (the second transmission characteristic) selected in the override mode. Besides, compared with at least the override transmission characteristic 255B, in the ACC transmission characteristic 255A, a threshold of the accelerator position at which the downshift (kickdown) of the transmission (TM) occurs is set to a higher value or an amount of change of the transmission ratio along with the downshift (kickdown) of the transmission (TM) is set to a lower value.

Moreover, when the driver operates the accelerator pedal 111 in the ACC mode, a control (referred to as "override control in the ACC mode" hereinafter) is performed, in which the override transmission characteristic 255B (the second transmission characteristic) instead of the ACC transmission characteristic 255A (the first transmission characteristic) selected in the ACC mode is selected when the accelerator position (driver accelerator position) determined by the operation of the driver is larger than the accelerator position (ACC accelerator position) for the inter-vehicle distance to the preceding vehicle to be the target inter-vehicle distance (override). The override control in the ACC mode is described below.

Figure 3:
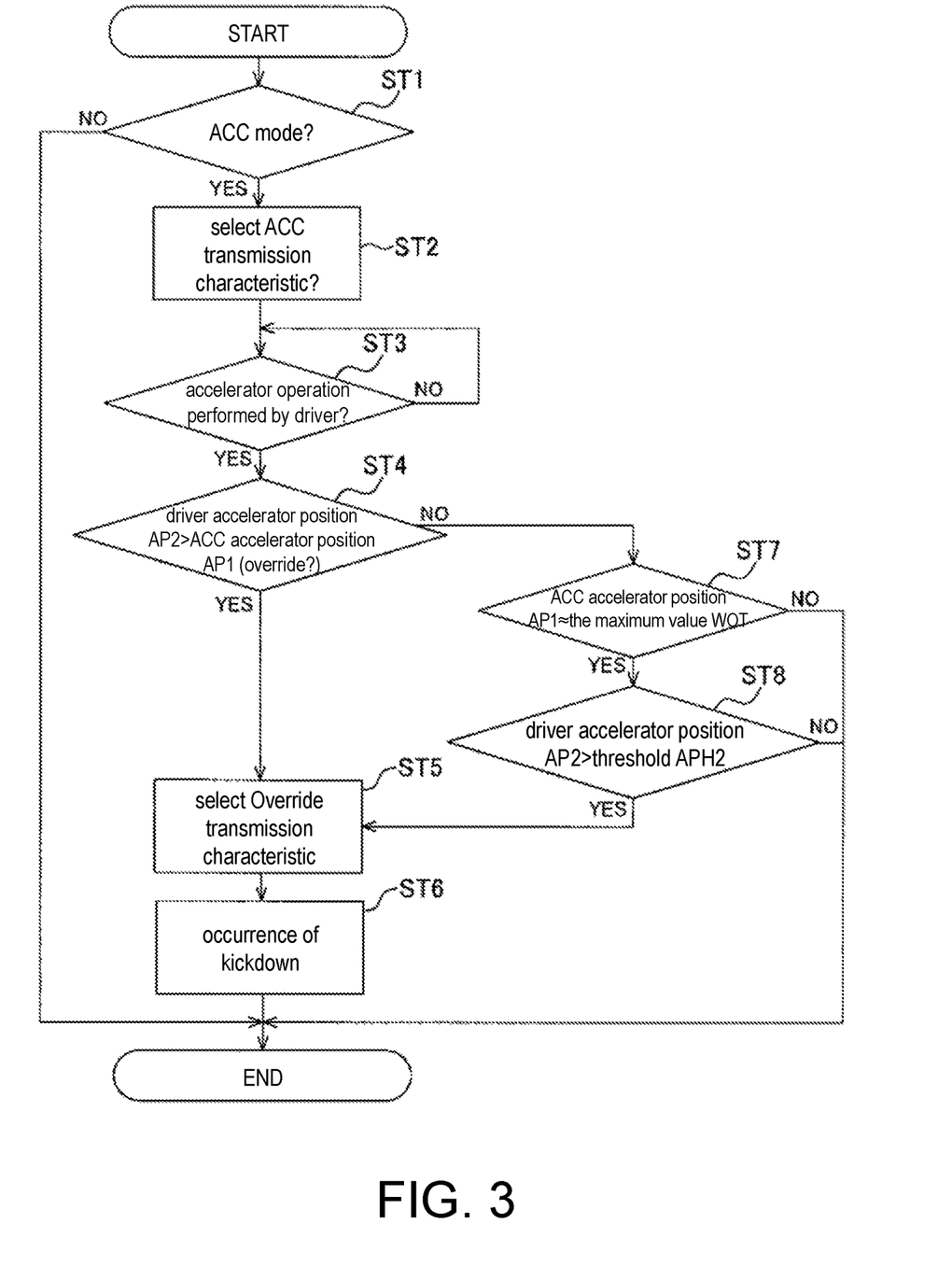
FIG. 3 is a flow chart showing a procedure of an override control in an ACC mode of an embodiment of the disclosure.

FIG. 3 is a flowchart for describing a procedure of the override control in the ACC mode. In the flowchart shown in the diagram, firstly, a judgment is made on whether the mode of the current travel control selected by the travel control device 101 is an ACC mode (step ST1). As a result, if it is not the ACC mode (NO), the processing ends directly; and if it is the ACC mode (YES), the ACC transmission characteristic 255A is selected (step ST2). In this state, a judgment is made on whether there is an operation of the accelerator pedal 111 performed by the driver (step ST3). As a result, when there is no operation of the accelerator pedal 111 performed by the driver (NO), a stand-by state is maintained until the driver operates the accelerator pedal 111; and when there is the operation of the accelerator pedal 111 performed by the driver (YES), a driver accelerator position AP2 and an ACC accelerator position AP1 are compared to judge whether the driver accelerator position AP2 is larger than the ACC accelerator position AP1 (whether there is an override) (step ST4). As a result, when the driver accelerator position AP2 is larger than the ACC accelerator position AP1 (there is an override) (YES), the transmission characteristic is switched from the ACC transmission characteristic 255A to the override transmission characteristic 255B (step ST5). In this way, the kickdown occurs in the automatic transmission TM (step ST6). On the other hand, when the driver accelerator position AP2 is smaller than the ACC accelerator position AP1 (there is no override) (NO) in step ST4, a judgment is further made on whether the ACC accelerator position AP1 is the maximum value WOT thereof or a value close to the maximum value WOT (step ST7). The judgment described herein on whether the ACC accelerator position AP1 is the value close to the maximum value WOT is made by judging whether the ACC accelerator position AP1 is larger than a value (threshold) which is smaller than the predetermined maximum value WOT by a prescribed amount. As a result, if the ACC accelerator position AP1 is not the maximum value WOT or the value close to the maximum value WOT (NO), the processing ends directly; and if the ACC accelerator position AP1 is the maximum value WOT or the value close to the maximum value WOT (YES), a judgment is further made on whether the driver accelerator position AP2 is larger than a predetermined threshold APH2 (a first threshold) (step ST8). As a result, if the driver accelerator position AP2 is smaller than the threshold APH2 (NO), the processing ends directly; and if the driver accelerator position AP2 is larger than the threshold APH2 (YES), the transmission characteristic is switched from the ACC transmission characteristic 255A to the override transmission characteristic 255B (step ST5). In this way, the kickdown occurs in the automatic transmission TM (step ST6).

Figure 4:
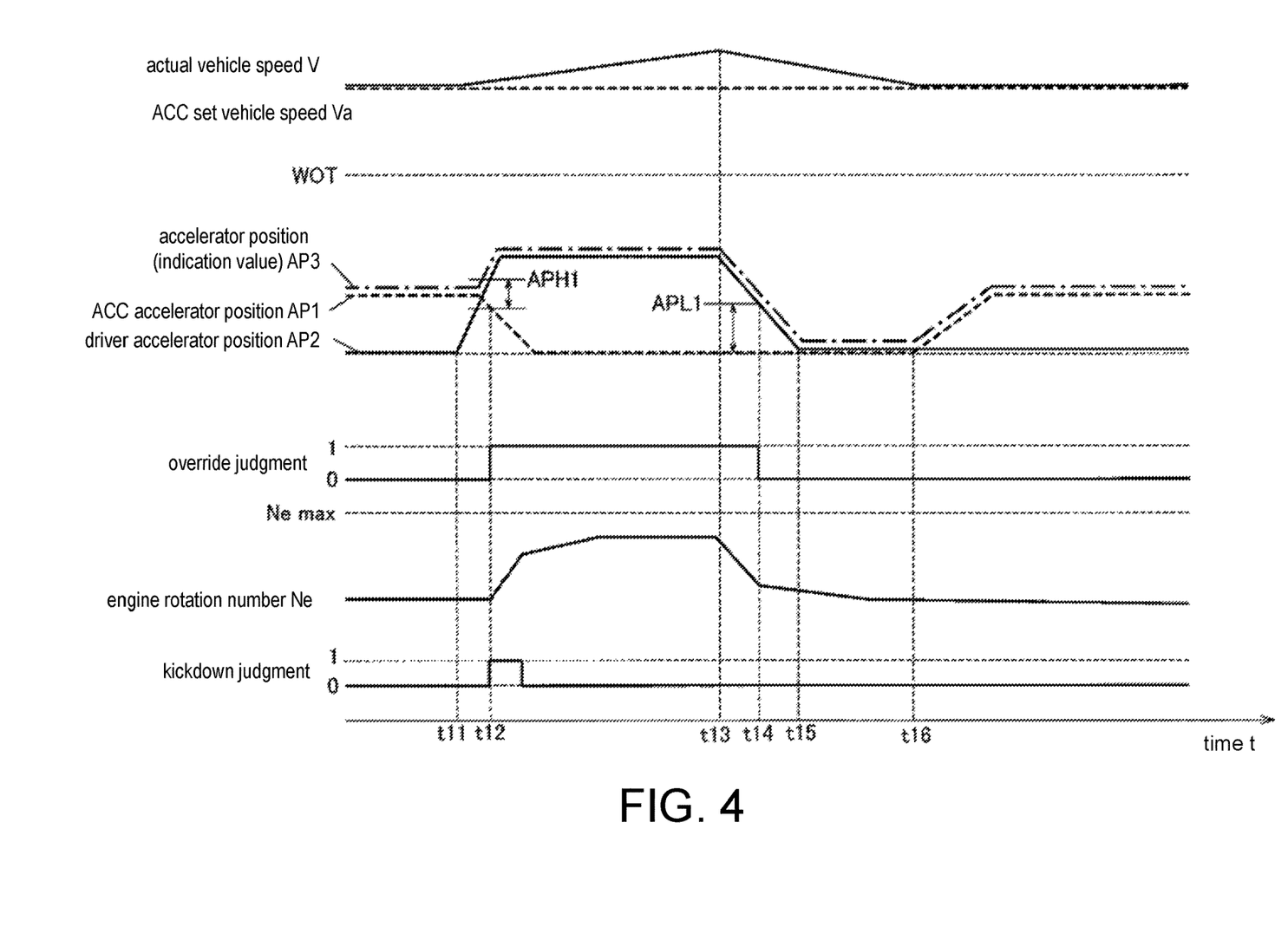
FIG. 4 is a timing chart showing a change of each value under the override control in the ACC mode in an embodiment of the disclosure.

FIG. 4 is a timing chart showing a change of each value under the override control in the ACC mode. In the timing charts of FIG. 4 and the following FIG. 5 to FIG. 7, a change with respect to an elapsed time (time) t for each of an actual vehicle speed V and an ACC set vehicle speed Va, the ACC accelerator position AP1 which is an ACC accelerator position (target value), the driver accelerator position AP2 which is an ACC accelerator position (target value) determined by the operation (override) of the driver, an accelerator position (indication value) AP3 which is used as an indication value for the driving device 119, existence of an override judgment, the engine rotation number Ne, and existence of a kickdown judgment, is shown. FIG. 4 is a timing chart in a case that the accelerator position (driver accelerator position) determined by the operation of the driver is larger than the accelerator position (ACC accelerator position) for the inter-vehicle distance to the preceding vehicle to be the target inter-vehicle distance.

In the timing chart of FIG. 4, firstly before a time t11, the vehicle 100 travels in the ACC mode and thereby the actual vehicle speed V is coincident with the ACC set vehicle speed Va. Then, at the time t11, the driver operates the accelerator pedal 111 and thereby the driver accelerator position AP2 starts rising. Along with this, the actual vehicle speed V starts rising with respect to the ACC set vehicle speed Va. After that, at a time t12, the driver accelerator position AP2 exceeds a value APH1 larger than the ACC accelerator position AP1 by a prescribed value or more, and thereby the override judgment is switched from "NO (0)" to "YES (1)". Accordingly, the transmission characteristic is switched from the ACC transmission characteristic 255A to the override transmission characteristic 255B. Therefore, the threshold of the accelerator position at which the downshift of the automatic transmission TM occurs is increased to a larger value, and thereby the kickdown (downshift) of the automatic transmission TM occurs. In addition, along with this, the engine rotation number Ne starts rising. After that, the accelerator position (indication value) AP3 becomes the driver accelerator position AP2, and the actual vehicle speed V gradually rises. Then, at a time t13, the driver accelerator position AP2 starts decreasing, and thereby the actual vehicle speed V is also reduced. At a time t14, the driver accelerator position AP2 is smaller than a value APL1 larger than the ACC accelerator position AP1 by a prescribed value or more, and thereby the override judgment is switched from "YES (1)" to "NO (0)". Accordingly, the transmission characteristic is switched from the override transmission characteristic 255B to the ACC transmission characteristic 255A. After that, at a time t15, the driver accelerator position AP2 becomes 0. After that, at a time t16, the ACC accelerator position AP1 starts rising again.

Figure 5:
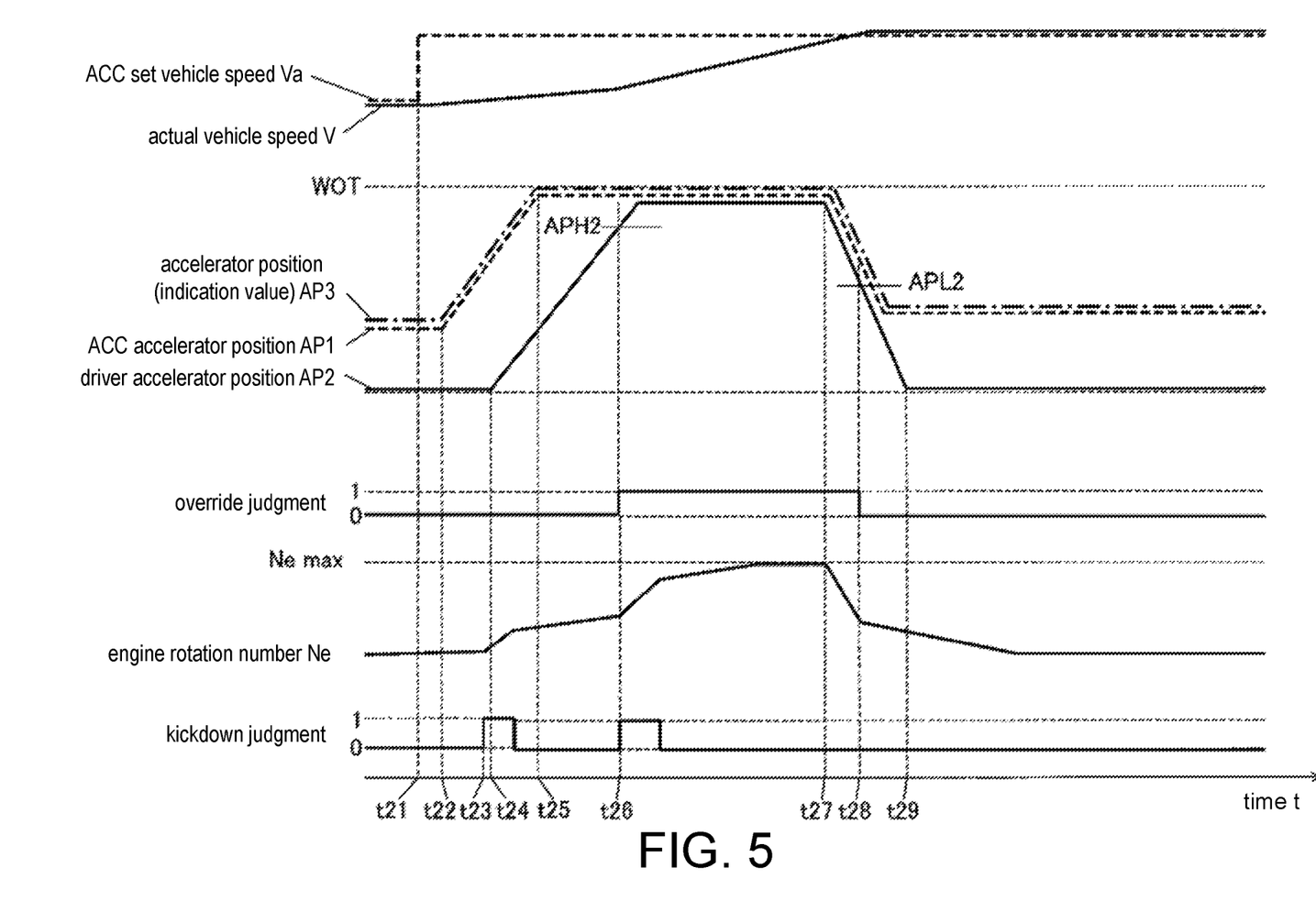
FIG. 5 is a timing chart showing the change of each value under the override control in the ACC mode (when an ACC accelerator position is the maximum value) in an embodiment of the disclosure.

FIG. 5 is a timing chart when the ACC accelerator position becomes the maximum value. In the timing chart of FIG. 5, firstly before a time t21, the vehicle 100 travels in the ACC mode and thereby the actual vehicle speed V is coincident with the ACC set vehicle speed Va. Then, at a time t21, the ACC set vehicle speed Va is changed to a larger vehicle speed, and thereby the ACC accelerator position AP1 starts rising after a time t22. Accordingly, at a time t23, the kickdown of the automatic transmission TM occurs. On the other hand, at a time t24, the driver operates the accelerator pedal 111 and thereby the driver accelerator position AP2 starts rising. After that, at a time t25, the AP1 becomes an upper limit value WOT and keeps the upper limit value WOT after that. After that, at a time t26, the driver accelerator position AP2 exceeds the threshold APH2 (the first threshold), and thereby the override judgment is switched from "NO (0)" to "YES (1)". Accordingly, the transmission characteristic is switched from the ACC transmission characteristic 255A to the override transmission characteristic 255B. Therefore, the threshold of the accelerator position at which the downshift of the automatic transmission TM occurs is increased to a larger value, and thereby the kickdown (downshift) of the automatic transmission TM occurs. In addition, the engine rotation number Ne rises along with this. Then, at a time t27, the ACC accelerator position AP1 starts decreasing, and thereby the engine rotation number Ne is also reduced. At a time t28, the driver accelerator position AP2 becomes smaller than the threshold APL2, and thereby the override judgment is switched from "YES (1)" to "NO (0)". Accordingly, the transmission characteristic is switched from the override transmission characteristic 255B to the ACC transmission characteristic 255A. After that, at a time t29, the driver accelerator position AP2 becomes 0. Herein, a case in which the threshold APH2 and the threshold APL2 are set as different values is shown, but the threshold APH2 and the threshold APL2 may also be the same value.

Figure 6:
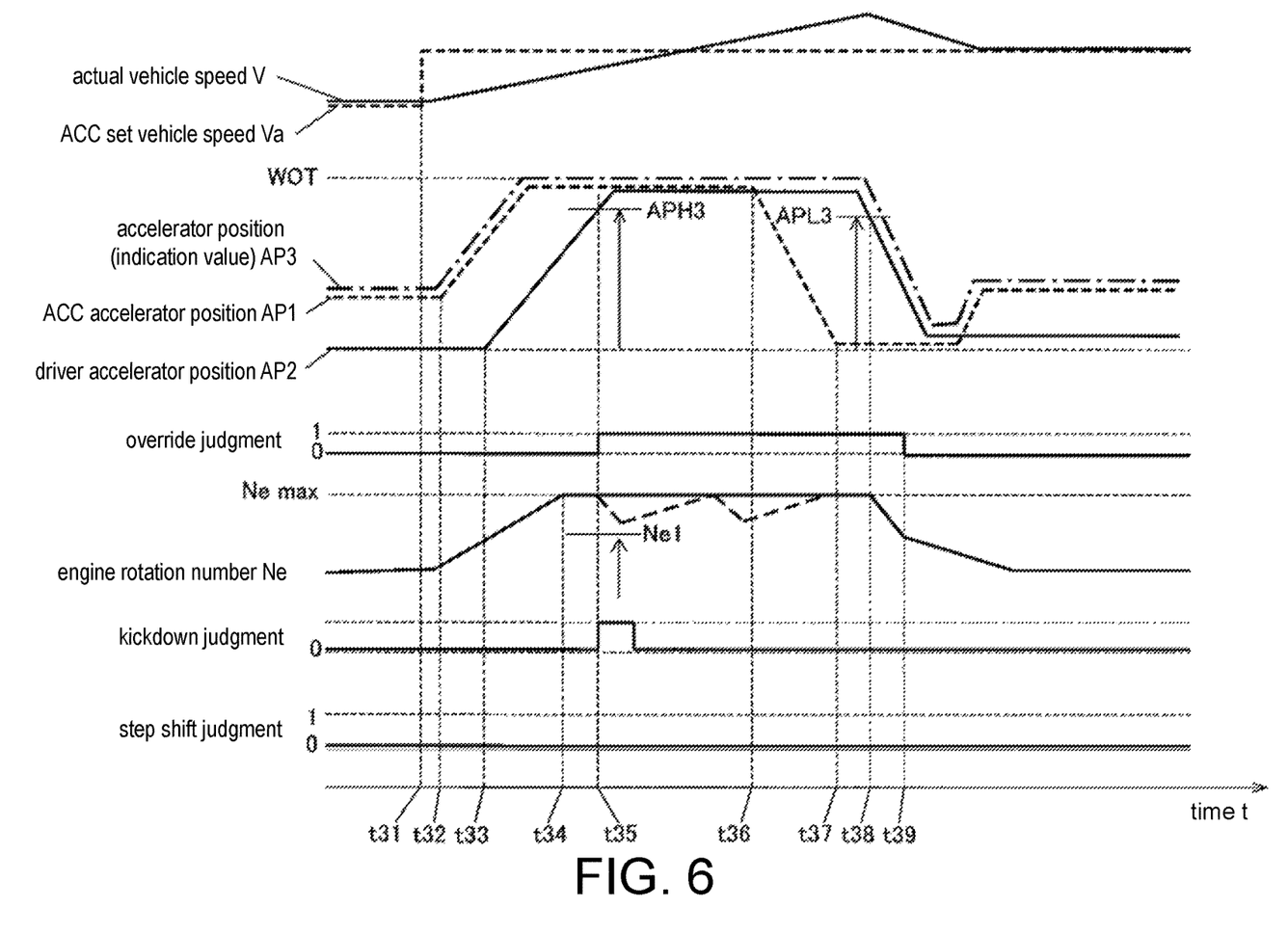
FIG. 6 is a timing chart showing the change of each value under the override control in the ACC mode (when a step shift control is not performed) in an embodiment of the disclosure.

FIG. 6 is a timing chart in a case that the step shift control is not performed under the override control in the ACC mode. In the timing chart of FIG. 6, firstly before a time t31, the vehicle 100 travels in the ACC mode and thereby the actual vehicle speed V is coincident with the ACC set vehicle speed Va. Then, at a time t31, the ACC set vehicle speed Va is changed to a larger vehicle speed, and thereby the ACC accelerator position AP1 starts rising after a time t32. In addition, the engine rotation number Ne also starts rising. On the other hand, at a time t33, the driver operates the accelerator pedal 111 and thereby the driver accelerator position AP2 starts rising. After that, at a time t34, the engine rotation number Ne exceeds a threshold Ne1 (the third threshold) and becomes the maximum value (upper limit value) Nemax. In addition, at a time t35, the driver accelerator position AP2 exceeds a threshold APH3 (the second threshold), and thereby the override judgment is switched from "NO (0)" to "YES (1)". Accordingly, the transmission characteristic is switched from the ACC transmission characteristic 255A to the override transmission characteristic 255B. Accordingly, the threshold of the accelerator position at which the downshift of the automatic transmission TM occurs is increased to a larger value, and thereby the kickdown (downshift) of the automatic transmission TM occurs. Herein, the driver accelerator position AP2 is a value close to the maximum value WOT and the rotation number Ne of the engine EG exceeds the threshold Ne1, and thereby the step shift control (the control which causes a change of the engine rotation number Ne shown by a dotted line in FIG. 6) in which the rotation number Ne of the engine EG and the transmission ratio of the automatic transmission TM are changed in steps is not performed. Therefore, the rotation number Ne of the engine EG keeps constant at the maximum value Nemax. After that, at a time t36, the ACC accelerator position AP1 starts decreasing; and at a time t37, the driver accelerator position AP2 starts decreasing. Then, at a time t38, the driver accelerator position AP2 becomes smaller than the threshold APL3, and thereby the override judgment is switched from "YES (1)" to "NO (0)" at a time t39. Accordingly, the transmission characteristic is switched from the override transmission characteristic 255B to the ACC transmission characteristic 255A.

That is, in principle, when the driver operates the accelerator pedal 111 in the front car follow-up travel mode, the travel control device 101 (119) performs the step shift control when the second accelerator position AP2 exceeds the threshold APH3 (the second threshold), and does not perform the step shift control when the second accelerator position AP2 does not exceed the threshold APH3. On other hand, as shown in FIG. 6, even when the second accelerator position AP2 exceeds the threshold APH3, the step shift control is performed when the rotation number Ne of the engine EG does not exceed the threshold Ne1 (the third threshold), and the step shift control is not performed when the rotation number Ne of the engine EG exceeds the threshold Ne1.

Figure 7:
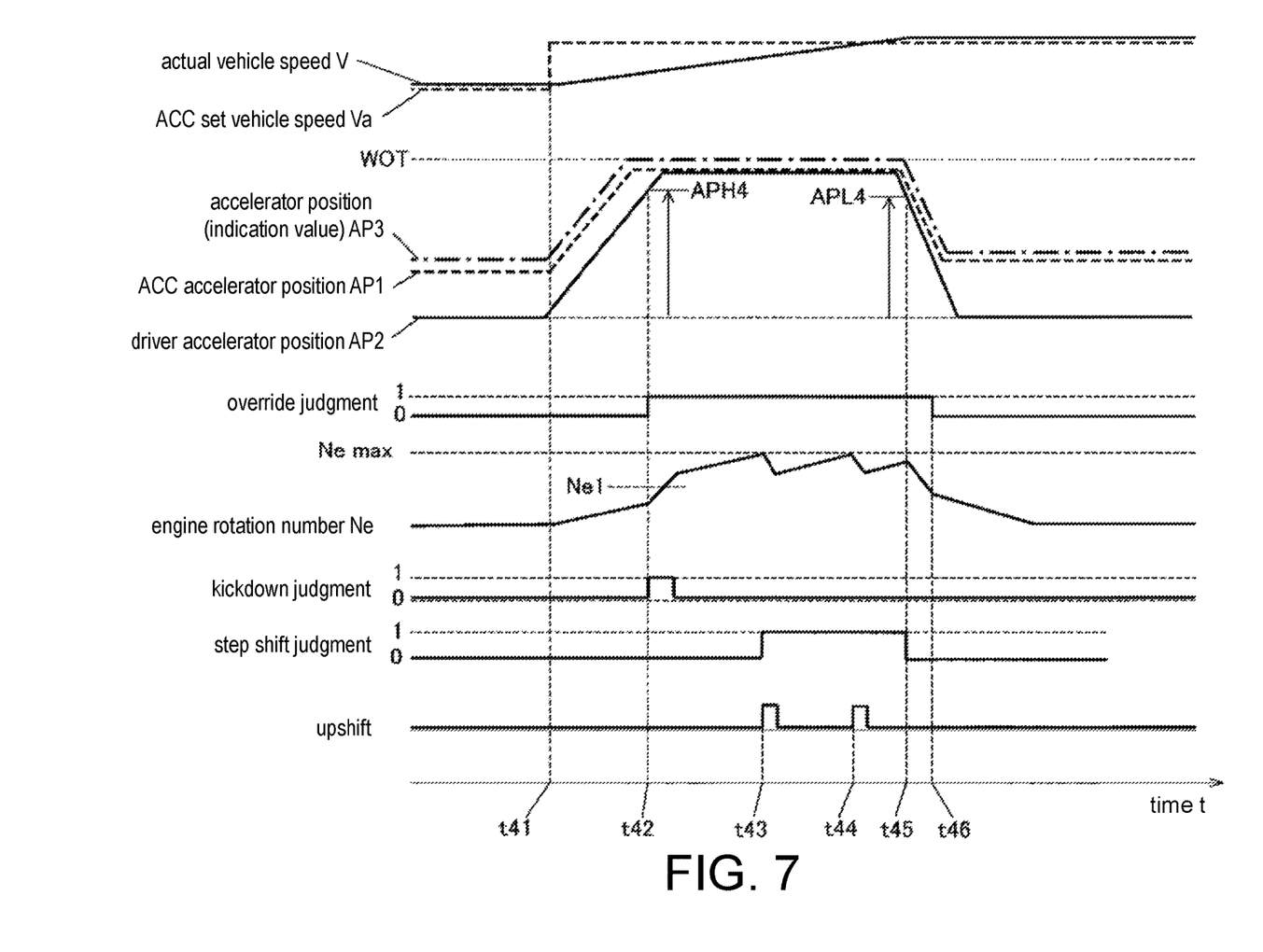
FIG. 7 is a timing chart showing the change of each value under the override control in the ACC mode (when the step shift control is performed) in an embodiment of the disclosure.

FIG. 7 is a timing chart in a case that the step shift control is performed under the override control in the ACC mode. In the timing chart of FIG. 7, firstly before a time t41, the vehicle 100 travels in the ACC mode and thereby the actual vehicle speed V is coincident with the ACC set vehicle speed Va. Then, at the time t41, the ACC set vehicle speed Va is changed to a larger vehicle speed, and thereby the ACC accelerator position AP1 starts rising after that. In addition, the engine rotation number Ne also starts rising. On the other hand, at the time t41, the driver operates the accelerator pedal 111 and thereby the driver accelerator position AP2 starts rising. After that, at a time t42, the driver accelerator position AP2 exceeds a threshold APH4 (the first threshold), and thereby the override judgment is switched from "NO (0)" to "YES (1)". Accordingly, the transmission characteristic is switched from the ACC transmission characteristic 255A to the override transmission characteristic 255B. Therefore, the threshold of the accelerator position at which the downshift of the automatic transmission TM occurs is increased to a larger value, and thereby the kickdown (downshift) of the automatic transmission TM occurs. In addition, at the time t42 when the override judgment is "YES", the engine rotation number Ne is smaller than the threshold Ne1, and thereby the step shift judgment is switched from "NO (0)" to "YES (1)" from a time t43 to a time t45. Accordingly, at the time t43 and the time t44, the step shift control in which the rotation number Ne of the engine EG and the transmission ratio of the automatic transmission TM are changed in steps is performed. After that, at the time t45, the driver accelerator position AP2 becomes smaller than the threshold APL4, and thereby the override judgment is switched from "YES (1)" to "NO (0)" at a time t46. Accordingly, the transmission characteristic is switched from the override transmission characteristic 255B to the ACC transmission characteristic 255A.

Furthermore, in the travel control device 101 (119) of the embodiment, when there is a difference between the actual rotation number and target rotation number of the driving pulley 231 arranged in the automatic transmission TM, a control is performed in which the actual rotation number is brought close to the target rotation number by controlling oil pressure supplied to the continuously variable transmission. Then, in this control, an inclination (referred to as an amount of change of value with respect to the elapsed time; the same shall apply hereinafter) is made different between the implementation of the ACC mode and the normal travel other than the ACC mode (the travel performed by user operation), that is, the implementation of the above normal travel mode or the override mode. Specifically, when the difference between the actual rotation number and the target rotation number is large in the implementation of the ACC mode, the inclination for bringing the actual rotation number close to the target rotation number is set to be large; on the other hand, when the difference between the actual rotation number and the target rotation number is large in the normal travel other than the ACC mode (the travel performed by user operation), the inclination for bringing the actual rotation number close to the target rotation number is set to be extremely large. In addition, when the difference between the actual rotation number and the target rotation number is small in the ACC mode, the inclination for bringing the actual rotation number close to the target rotation number is set to be small; on the other hand, when the difference between the actual rotation number and the target rotation number is small in the normal travel other than the ACC mode (the travel performed by user operation), the inclination for bringing the actual rotation number close to the target rotation number is set to be moderate. In other words, the control is performed in a manner that the inclination for bringing the actual rotation number close to the target rotation number is larger in the normal travel other than the ACC mode (the travel performed by user operation) than in the ACC mode.

In addition, in the control of bringing the actual rotation number close to the target rotation number by controlling oil pressure supplied to the continuously variable transmission, in the normal travel (the travel performed by user operation) other than the ACC mode, a control may be further performed in which the target rotation number itself is set at a value higher than the target rotation number in the ACC mode.

By performing this control, the following effects can be obtained: a smooth transmission can be achieved in the implementation of the ACC mode; and during the normal travel other than the ACC mode (the travel performed by user operation), the user who performs this operation or the vehicle occupant hardly notices the transmission and thus a more active transmission operation can be performed.

As described above, according to the vehicle control device of the embodiment, the engine EG which is the driving source of the vehicle, the automatic transmission TM which shifts rotation of the driving force from the engine EG and transmits the rotation to the driving wheel side, and the travel control device 101 (119) which controls the driving force of the engine EG and the transmission ratio of the automatic transmission TM are included; the travel control device 101 (119) can switch and perform the front car follow-up travel mode in which the driving force and the transmission ratio are controlled based on the accelerator position AP1 (the first accelerator position) for the inter-vehicle distance to the preceding vehicle to be the target inter-vehicle distance, and the override mode in which the driving force and the transmission ratio are controlled based on the accelerator position AP2 (the second accelerator position) determined by the operation of the accelerator pedal 111 performed by the driver. Besides, the transmission characteristic showing the relationship between the vehicle speed of the vehicle and the transmission ratio of the automatic transmission TM includes the first transmission characteristic 255A selected in the front car follow-up travel mode and the second transmission characteristic 255B selected in the override mode; and compared with the second transmission characteristic 255B, in the first transmission characteristic 255A, the threshold of the accelerator position at which at least the downshift of the automatic transmission TM occurs is set to a higher value or the amount of change of the transmission ratio along with the downshift of the automatic transmission TM is set to a lower value.

According to the vehicle control device of the embodiment, compared with the second transmission characteristic 255B selected in the override mode, in the first transmission characteristic 255A selected in the front car follow-up travel mode, the threshold of the accelerator position at which at least the downshift of the transmission TM occurs is set to a higher value or the amount of change of the transmission ratio along with the downshift of the transmission TM is set to a lower value, and thereby the downshift (kickdown) of the transmission TM can be more difficult to occur or the amount of change of the transmission ratio along with the downshift can be suppressed to a smaller value in the front car follow-up travel mode than in the override mode. Accordingly, the kickdown can be prevented from occurring frequently in the front car follow-up travel mode, and thus occurrence of slight fluctuations (hunting) of the rotation number of the engine EG can be effectively suppressed.

On the other hand, in the override mode in which the driving force of the engine EG and the transmission ratio of the automatic transmission TM are controlled based on the accelerator position (driver accelerator position) AP2 determined by the operation of the accelerator pedal 111 performed by the driver, the downshift (kickdown) of the transmission is made easy to occur, and the amount of change of the transmission ratio along with the downshift of the automatic transmission TM is increased, and thereby acceleration of the vehicle that more properly reflects an intention of the driver can be achieved.

In addition, in the embodiment, the travel control device 101 (119) selects, when the driver operates the accelerator pedal (111) in the front car follow-up travel mode, the second transmission characteristic 255B instead of the first transmission characteristic 255A in the front car follow-up travel mode, on the condition that the second accelerator position AP2 is larger than the first accelerator position AP1.

When the driver operates the accelerator pedal 111 in the front car follow-up travel mode, it is clear that the driver has an intention to accelerate the vehicle 100 when the accelerator position AP2 determined by the operation of the driver is larger than the accelerator position AP1 for the inter-vehicle distance to the preceding vehicle to be the target inter-vehicle distance. Accordingly, in this case, if the downshift (kickdown) of the automatic transmission TM is made easy to occur or the amount of change of the transmission ratio along with the downshift of the automatic transmission TM is increased by selecting the second transmission characteristic 255B instead of the first transmission characteristic 255A, acceleration of the vehicle 100 that more properly reflects an intention of driver can be achieved.

In addition, in the embodiment, the travel control device 101 (119) selects, when the driver operates the accelerator pedal 111 in the front car follow-up travel mode, the second transmission characteristic 255B instead of the first transmission characteristic 255A in the front car follow-up travel mode, on the condition that the first accelerator position AP1 is the maximum value WOT or a value close to the maximum value WOT and the second accelerator position AP2 is larger than the first threshold APH2 which is a value smaller than the first accelerator position AP1.

According to this configuration, the downshift (kickdown) of the automatic transmission TM can be more reliably made to occur even when the first accelerator position AP1 is the maximum value WOT or the value close to the maximum value WOT. Accordingly, acceleration of the vehicle 100 that more properly reflects an intention of the driver can be achieved.

In addition, in the embodiment, the automatic transmission TM is a continuously variable transmission capable of steplessly changing the transmission ratio, and the travel control device 101 (119) can perform a step shift control in which the rotation number Ne of the engine EG and the transmission ratio of the automatic transmission TM are changed in steps. Besides, when the driver operates the accelerator pedal 111 in the front car follow-up travel mode, the step shift control is performed only when the second accelerator position AP2 exceeds the threshold APH3 (the second threshold), and the step shift control is not performed when the second accelerator position AP2 does not exceed the threshold APH3.

According to this configuration, when the driver operates the accelerator pedal 111 in the front car follow-up travel mode, a feeling of strangeness may be felt by the driver of the vehicle 100 if the step shift control is performed when the accelerator position AP2 determined by the operation is small; however, according to the above configuration, the step shift control is performed only when the second accelerator position AP2 exceeds the threshold APH3, and thereby the step shift control is not performed when the accelerator position AP2 determined by the operation of the driver is small, and thus the feeling of strangeness is not felt by the driver.

On the other hand, even if the second accelerator position AP2 exceeds the threshold APH3, the step shift control is performed when the rotation number Ne of the engine EG does not exceed the threshold Ne1 (the third threshold), and the step shift control is not performed when the rotation number Ne of the engine EG exceeds the threshold Ne1.

According to this configuration, when the driver operates the accelerator pedal 111 in the front car follow-up travel mode and thereby the second accelerator position AP2 is the maximum value WOT or the value close to the maximum value WOT, the step shift control is performed when the rotation number Ne of the engine EG does not exceed the third threshold (Ne1), and thereby the step shift control is performed only when there is room for increase in the rotation number of the engine EG. Accordingly, by upshifting the automatic transmission TM in a state that the accelerator position along with the operation of the driver is the maximum value or the value close to the maximum value and the rotation number Ne of the engine EG is large, the feeling of strangeness felt by the driver can be effectively prevented.

The embodiments of the disclosure are described above, but the disclosure is not limited to the above embodiments, and various modifications can be made within the scope of claims and the scope of technical thoughts described in the specification and the drawings. For example, a case is shown in which the driving force and the transmission ratio are controlled based on the accelerator position AP1 (the first accelerator position) for the inter-vehicle distance to the preceding vehicle to be the target inter-vehicle distance in the front car follow-up travel mode of the disclosure in the above embodiments, but in addition, in the front car follow-up travel mode of the disclosure, an accelerator position for the vehicle speed to be the target set vehicle speed may be set as the first accelerator position and the driving force and the transmission ratio are controlled based on this accelerator position.

What is claimed is:

1. A vehicle control device, comprising:
a driving source of a vehicle;
a transmission which shifts rotation of a driving force from the driving source and transmits the rotation to a driving wheel side; and
a travel control device which controls the driving force of the driving source and a transmission ratio of the transmission,
wherein the travel control device is capable of operating in following modes comprising
a front car follow-up travel mode, in which the driving force and the transmission ratio are controlled based on a first accelerator position which is an accelerator position for an inter-vehicle distance to a preceding vehicle to be a target inter-vehicle distance or for a vehicle speed to be a target set vehicle speed; and
an override mode, in which the driving force and the transmission ratio are controlled based on a second accelerator position which is an accelerator position determined by an operation of an accelerator operator performed by a driver,
wherein a transmission characteristic, showing a relationship between the vehicle speed of the vehicle and the transmission ratio of the transmission, comprises a first transmission characteristic selected in the front car follow-up travel mode, and a second transmission characteristic selected in the override mode,
wherein, compared with the second transmission characteristic, in the first transmission characteristic, a threshold of the accelerator position at which at least downshift of the transmission occurs is set to a higher value or an amount of change of the transmission ratio along with the downshift of the transmission is set to a lower value,
wherein the travel control device selects,
when the driver operates the accelerator operator in the front car follow-up travel mode,
the second transmission characteristic instead of the first transmission characteristic in the front car follow-up travel mode, on the condition that the first accelerator position is a maximum value or a value close to the maximum value and the second accelerator position is larger than a first threshold which is a value smaller than the first accelerator position.

2. The vehicle control device according to claim 1,
wherein the travel control device selects,
when the driver operates the accelerator operator in the front car follow-up travel mode,
the second transmission characteristic instead of the first transmission characteristic in the front car follow-up travel mode, on the condition that the second accelerator position is larger than the first accelerator position.

3. The vehicle control device according to claim 2,
wherein the transmission is a continuously variable transmission capable of steplessly changing the transmission ratio;
when there is a difference between an actual rotation number and a target rotation number of the continuously variable transmission, the travel control device performs a control in which the actual rotation number is brought close to the target rotation number by controlling oil pressure supplied to the continuously variable transmission; and
in this control, an inclination for bringing the actual rotation number close to the target rotation number is varied between the implementation of the front car follow-up travel mode and the implementation of the override mode.

4. The vehicle control device according to claim 3, wherein the inclination for bringing the actual rotation number close to the target rotation number is greater in the implementation of the override mode than in the implementation of the front car follow-up travel mode.

5. The vehicle control device according to claim 2, wherein the transmission is a continuously variable transmission capable of steplessly changing the transmission ratio;

when there is a difference between an actual rotation number and a target rotation number of the continuously variable transmission, the travel control device performs a control in which the actual rotation number is brought close to the target rotation number by controlling oil pressure supplied to the continuously variable transmission; and in this control, the target rotation number is varied between the implementation of the front car follow-up travel mode and the implementation of the override mode.

6. The vehicle control device according to claim 5, wherein the target rotation number is larger in the implementation of the override mode than in the implementation of the front car follow-up travel mode.

7. The vehicle control device according to claim 1, wherein the transmission is a continuously variable transmission capable of steplessly changing the transmission ratio;

the travel control device is capable of performing a step shift control in which a rotation number of the driving source and the transmission ratio of the transmission are changed in steps; and when the driver operates the accelerator operator in the front car follow-up travel mode, the step shift control is performed when the second accelerator position exceeds a second threshold, and the step shift control is not performed when the second accelerator position does not exceed the second threshold.

8. The vehicle control device according to claim 7, wherein if the second accelerator position exceeds the second threshold, the step shift control is performed when the rotation number of the driving source does not exceed a third threshold.

9. The vehicle control device according to claim 1, wherein the transmission is a continuously variable transmission capable of steplessly changing the transmission ratio, the travel control device is capable of performing a step shift control in which a rotation number of the driving source and the transmission ratio of the transmission are changed in steps; and when the driver operates the accelerator operator in the front car follow-up travel mode, the step shift control is performed when the second accelerator position is the maximum value or a value close to the maximum value and the rotation number of the driving source does not exceed a third threshold, and the step shift control is not performed when the rotation number of the driving source exceeds the third threshold.

10. The vehicle control device according to claim 1, wherein the transmission is a continuously variable transmission capable of steplessly changing the transmission ratio;

when there is a difference between an actual rotation number and a target rotation number of the continuously variable transmission, the travel control device performs a control in which the actual rotation number is brought close to the target rotation number by controlling oil pressure supplied to the continuously variable transmission; and in this control, an inclination for bringing the actual rotation number close to the target rotation number is varied between the implementation of the front car follow-up travel mode and the implementation of the override mode.

11. The vehicle control device according to claim 10, wherein the inclination for bringing the actual rotation number close to the target rotation number is greater in the implementation of the override mode than in the implementation of the front car follow-up travel mode.

12. The vehicle control device according to claim 1, wherein the transmission is a continuously variable transmission capable of steplessly changing the transmission ratio;

when there is a difference between an actual rotation number and a target rotation number of the continuously variable transmission, the travel control device performs a control in which the actual rotation number is brought close to the target rotation number by controlling oil pressure supplied to the continuously variable transmission; and in this control, the target rotation number is varied between the implementation of the front car follow-up travel mode and the implementation of the override mode.

13. The vehicle control device according to claim 12, wherein the target rotation number is larger in the implementation of the override mode than in the implementation of the front car follow-up travel mode.

14. A vehicle control device, comprising:

a driving source of a vehicle;

a transmission which shifts rotation of a driving force from the driving source and transmits the rotation to a driving wheel side; and a travel control device which controls the driving force of the driving source and a transmission ratio of the transmission, wherein the travel control device is capable of operating in following modes comprising a front car follow-up travel mode, in which the driving force and the transmission ratio are controlled based on a first accelerator position which is an accelerator position for an inter-vehicle distance to a preceding vehicle to be a target inter-vehicle distance or for a vehicle speed to be a target set vehicle speed; and an override mode, in which the driving force and the transmission ratio are controlled based on a second accelerator position which is an accelerator position determined by an operation of an accelerator operator performed by a driver, wherein a transmission characteristic, showing a relationship between the vehicle speed of the vehicle and the transmission ratio of the transmission, comprises a first transmission characteristic selected in the front car follow-up travel mode, and a second transmission characteristic selected in the override mode, wherein, compared with the second transmission characteristic, in the first transmission characteristic, a threshold of the accelerator position at which at least downshift of the transmission occurs is set to a higher value or an amount of change of the transmission ratio along with the downshift of the transmission is set to a lower value, wherein the travel control device selects, when the driver operates the accelerator operator in the front car follow-up travel mode, the second transmission characteristic instead of the first transmission characteristic in the front car follow-up travel mode, on the condition that the second accelerator position is larger than the first accelerator position, wherein the transmission is a continuously variable transmission capable of steplessly changing the transmission ratio;

the travel control device is capable of performing a step shift control in which a rotation number of the driving source and the transmission ratio of the transmission are changed in steps; and when the driver operates the accelerator operator in the front car follow-up travel mode, the step shift control is performed when the second accelerator position exceeds a second threshold, and the step shift control is not performed when the second accelerator position does not exceed the second threshold.

15. The vehicle control device according to claim 14, wherein if the second accelerator position exceeds the second threshold, the step shift control is performed when the rotation number of the driving source does not exceed a third threshold.

16. A vehicle control device, comprising:

a driving source of a vehicle;

a transmission which shifts rotation of a driving force from the driving source and transmits the rotation to a driving wheel side; and a travel control device which controls the driving force of the driving source and a transmission ratio of the transmission, wherein the travel control device is capable of operating in following modes comprising a front car follow-up travel mode, in which the driving force and the transmission ratio are controlled based on a first accelerator position which is an accelerator position for an inter-vehicle distance to a preceding vehicle to be a target inter-vehicle distance or for a vehicle speed to be a target set vehicle speed; and an override mode, in which the driving force and the transmission ratio are controlled based on a second accelerator position which is an accelerator position determined by an operation of an accelerator operator performed by a driver, wherein a transmission characteristic, showing a relationship between the vehicle speed of the vehicle and the transmission ratio of the transmission, comprises a first transmission characteristic selected in the front car follow-up travel mode, and a second transmission characteristic selected in the override mode, wherein, compared with the second transmission characteristic, in the first transmission characteristic, a threshold of the accelerator position at which at least downshift of the transmission occurs is set to a higher value or an amount of change of the transmission ratio along with the downshift of the transmission is set to a lower value, wherein the travel control device selects, when the driver operates the accelerator operator in the front car follow-up travel mode, the second transmission characteristic instead of the first transmission characteristic in the front car follow-up travel mode, on the condition that the second accelerator position is larger than the first accelerator position, wherein the transmission is a continuously variable transmission capable of steplessly changing the transmission ratio, the travel control device is capable of performing a step shift control in which a rotation number of the driving source and the transmission ratio of the transmission are changed in steps; and when the driver operates the accelerator operator in the front car follow-up travel mode, the step shift control is performed when the second accelerator position is the maximum value or a value close to the maximum value and the rotation number of the driving source does not exceed a third threshold, and the step shift control is not performed when the rotation number of the driving source exceeds the third threshold.

* * * * *